(12) United States Patent
Simon

(10) Patent No.: US 11,065,596 B2
(45) Date of Patent: Jul. 20, 2021

(54) ANCHORING MESH FOR AN ANTI-EROSION COATING

(71) Applicant: TOTAL RAFFINAGE CHIMIE, Courbevoie (FR)

(72) Inventor: Hubert Simon, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/640,764

(22) PCT Filed: Jul. 16, 2018

(86) PCT No.: PCT/EP2018/069216
§ 371 (c)(1),
(2) Date: Feb. 21, 2020

(87) PCT Pub. No.: WO2019/037950
PCT Pub. Date: Feb. 28, 2019

(65) Prior Publication Data
US 2020/0206712 A1    Jul. 2, 2020

(30) Foreign Application Priority Data
Aug. 23, 2017    (FR) ...................................... 1757810

(51) Int. Cl.
*B01J 8/00* (2006.01)
*B01J 8/18* (2006.01)
(Continued)

(52) U.S. Cl.
CPC ................ *B01J 19/02* (2013.01); *B01J 8/24* (2013.01); *B01J 19/0053* (2013.01); *C10G 11/18* (2013.01); *B01J 2219/0236* (2013.01)

(58) Field of Classification Search
CPC ......... B01J 8/00; B01J 8/18; B01J 8/24; B01J 19/00; B01J 19/0053; B01J 19/02;
(Continued)

(56) References Cited

U.S. PATENT DOCUMENTS
2013/0108519 A1    5/2013    Sandacz

FOREIGN PATENT DOCUMENTS
FR    3028307 A1    5/2016
WO    WO-2016071305 A1 *    5/2016    ............. C22C 38/48

OTHER PUBLICATIONS

International Search Report issued in Application No. PCT/EP2018/069216, dated Aug. 9, 2018; 5 pages.

* cited by examiner

*Primary Examiner* — Natasha E Young
(74) *Attorney, Agent, or Firm* — Albert Shung

(57) ABSTRACT

The invention relates to a metal anchoring mesh intended to be secured to a metal wall of a chamber of a fluid catalytic cracking unit, in order to form cells (64). Said metal anchoring mesh comprises a plurality of wavy elementary parts (12, 14) connected successively together, forming cylindrical surfaces that are able to respectively define said cells, said cylindrical surfaces each having a central axis of symmetry A, the wavy elementary parts (12,14) each having protruding tongues (42', 44'), said protruding tongues being able to extend respectively inside said cells (64). Said tongues (42', 44') extend along a length less than a quarter of the distance d that extends between said cylindrical surface and said central axis of symmetry A of said cylindrical surface.

9 Claims, 3 Drawing Sheets

(51) Int. Cl.
  *B01J 8/24* (2006.01)
  *B01J 19/00* (2006.01)
  *B01J 19/02* (2006.01)
  *B32B 3/00* (2006.01)
  *B32B 3/10* (2006.01)
  *B32B 3/12* (2006.01)
  *C10G 11/00* (2006.01)
  *C10G 11/14* (2006.01)
  *C10G 11/18* (2006.01)

(58) Field of Classification Search
  CPC ............... B01J 2219/00; B01J 2219/02; B01J 2219/0204; B01J 2219/0218; B01J 2219/0236; B32B 3/00; B32B 3/10; B32B 3/12; B32B 15/00; B32B 15/04; B32B 15/043; B32B 2307/00; B32B 2307/70; B32B 2307/752; B32B 2439/00; C10G 11/00; C10G 11/14; C10G 11/18
  See application file for complete search history.

ANCHORING MESH FOR AN ANTI-EROSION COATING

CROSS-REFERENCE TO RELATED APPLICATIONS

This application claims the benefit of PCT/EP2018/069216, now WO 2019/037950, filed Jul. 16, 2018, which claims priority from FR 1757810 filed Aug. 23, 2017, which are incorporated herein by reference in their entireties for all purposes.

The present invention relates to a metal anchoring mesh intended to be attached to a metal wall of a vessel of a refining unit in order to be able to anchor an anti-erosion coating.

One envisioned field of application is, particularly although not exclusively, that of fluid catalytic cracking (FCC) units.

Fluid catalytic cracking units, or in other words fluidized-bed catalytic cracking units, allow heavy fractions involving long hydrocarbon chains to be converted, in the presence of a catalyst, into lighter fractions. The catalyst therefore circulates in a fluidized bed at speeds that are sometimes high between a reactor and a regenerator at temperatures comprised between 450° C. and 750° C., at low pressure. In the steady-state, the reactor temperature reaches substantially between 510° C. and 540° C., whereas the regenerator temperature reaches between 730° C. and 760° C. Hence, the metal wall of the reactor, of the regenerator and of their internal equipment, notably the cyclones, the separators or the air distributors, is covered with a coating intended to protect them from erosion caused by the movements of the catalyst charger. Upstream of the reactor, the internal wall of the feeding riser may also be covered with the coating, as may the internal wall of the cyclones situated downstream. This coating is a composite material containing concrete and a metal anchoring mesh.

The metal anchoring mesh is thus welded to the metal wall so as to form cells able to receive concrete. Said metal anchoring mesh comprises a plurality of corrugated longitudinal elementary components connected successively to one another by the crests of their corrugations to form cylindrical surfaces respectively able to define the cells. The longitudinal elementary components are usually made of steel strip, and are joined together by stapling. To achieve this, the crests of the corrugated elementary components exhibit an alternation of stapling tabs and stapling orifices, which are produced during a single punching/stamping operation. The elementary components are then successively fitted against one another, respectively offset by half their pitch so that the stapling tabs can enter the stapling orifices. The stapling tabs are then bent over toward one another to secure the elementary components together and thus form a mesh. The latter is then applied to the metal wall in such a way that the edge face of the corrugated elementary components is brought into contact with the metal wall, then welded seams are then produced inside the cells between the elementary components and the metal wall to secure the mesh to the metal wall.

Also, the corrugated elementary components have, for each of the corrugations and away from the crests of the corrugations, tongues which project therefrom and which therefore extend into the cells when the mesh is formed. These tongues thus allow better retention of the concrete after this concrete has been applied to and pushed into the cells and has hardened. Reference may notably be made to document FR 3 028 307, which describes an anchoring mesh having such tongues.

These tongues are also produced during the single operation of punching/stamping the strip. In this way there is formed, in the longitudinal direction of the strip, an oblong cut which is interrupted at one end of the cut and the cut shape is bent about said end. The cut and bent shape constitutes the projecting tongue, whereas an oblong slot is generated. The oblong slot thus generated also encourages the concrete to anchor into the mesh.

The tongues make a significant contribution to the anchoring of the concrete in the mesh, but do, however, make it less easy to weld the mesh to the metal wall. Furthermore, this encourages occlusions of air during the application of the concrete and, subsequently, the formation of gas pockets and, as a result, corrosion or deposits of coke.

Hence, one problem that arises and that the present invention seeks to solve is therefore that of providing an anchoring mesh that can easily be implemented and secured to the metal wall. It is also that of providing such an anchoring mesh that avoids the degradation of the anti-erosion coating during operation.

To this end, there is proposed a metal anchoring mesh intended to be secured to a metal wall of a vessel of a fluid catalytic cracking unit to form cells able to receive an anti-erosion coating protecting said metal wall, said metal anchoring mesh comprising a plurality of corrugated elementary components successively joined together to form cylindrical surfaces able respectively to define said cells, said cylindrical surfaces each having a central axis of symmetry, the corrugated elementary components of said plurality of corrugated elementary components each having projecting tongues, said projecting tongues being able to extend respectively into said cells. Said tongues extend over a length less than one quarter of the distance extending between said cylindrical surface and said central axis of symmetry of said cylindrical surface.

Thus, one feature of the invention lies in the use of tongues which are short, the length of which is less than one quarter of the distance extending from the cylindrical surface to the central axis of symmetry of this cylindrical surface. It will be noted that the cylindrical surface extends from a surface defined by a generatrix supported by a closed directrix curve defining a center. As a result, the cross section of the cylindrical surface is not necessarily circular, and is, for example, hexagonal, as will be explained later on in the description. The central axis of symmetry therefore intersects said center and extends parallel to the generatrices.

In that way, it is easier to weld the mesh to the metal wall of the vessel through the cells. What is more, when the mesh has to be shaped to fit a concave metal wall for example, the risk of the free end of the tongues coming into contact with said metal wall is removed. Furthermore, the concrete can be applied to and pushed into the cells without air occlusions. So, by virtue of the short tongues, during operation at temperatures in excess of 700° C., the differential expansion of the concrete and of the tongues is small in amplitude and, as a result, lessens the risks of cracking of the coating.

It will be seen that the mesh according to the invention does not necessarily have tongues in all of its cells.

More advantageously still, said tongues extend over a length less than one fifth of the distance extending between said cylindrical surface and said central axis of symmetry of said cylindrical surface. Hence, and as will be explained in greater detail later on in the description, at least two interrupted oblong cuts per deformation pattern are formed in the metal strip, so that at least two tongues facing one another can be formed per cell. In that way, after the concrete has been applied and pushed in, the portion of coating that is trapped inside the cell is held between two substantially opposing tongues.

Under certain circumstances, it is possible to create just one tongue per cell, and as indicated hereinabove, of all the cells of the mesh, some may be without tongues.

Hence, said corrugated elementary components advantageously have oblong slots extending between two opposite ends, whereas said tongues extend respectively from one of said opposite ends of oblong slot as far as a tongue free end. In that way, the concrete flows not only around the tongues but also through the oblong slots, providing better anchorage of the coating.

According to one particularly advantageous feature of the invention, said tongues extend over a length shorter than the length of said oblong slots. Thus, in practice, relatively long interrupted oblong cutouts are made and, once the tongues have been bent, these are cut off, for example mid-way along their length. In that way, the tongues obtained are short, making it possible to avoid all the aforementioned disadvantages and, what is more, the oblong slots have a length that allows them to accommodate more concrete. In that way, the anchorage of the coating is enhanced.

In addition, according to one particularly advantageous embodiment of the invention, said tongue free end is rounded. That avoids the operators injuring themselves when applying the concrete to the cells.

According to another embodiment, the tongues extend over a length comprised between ¼ and ½ of the length of the oblong slot.

Furthermore, and according to one particularly advantageous feature of the invention, said corrugated elementary components have corrugations of isosceles trapezoidal shape. Thus, the corrugated elementary components extend longitudinally and are formed from metal strip having, for example, a thickness of 2 mm and a width of 25 mm. Also, the corrugations are uniformly spaced apart. In that way, two corrugated elementary components are paired via the crest of their corrugations in a manner that is offset by half their pitch and, as a result, form cylindrical surfaces of substantially hexagonal cross section, as will be explained in greater detail hereinafter. The cylindrical surfaces thus have a central axis of symmetry to which reference can be made in assessing the length of the tongues.

Also, said corrugated elementary components preferably have stapling orifices and stapling tabs so that said corrugated elementary components can be successively joined together. According to one particular embodiment, said corrugations of each of said corrugated elementary components exhibit, in alternation, stapling orifices and stapling tabs. For example, the crests of the corrugations of the corrugated elementary components exhibit, in alternation, a pair of stapling orifices and a pair of stapling tabs which are oriented toward the outside of the trapezium. Thus, by superimposing two elementary components which are offset by half their pitch, the pairs of stapling tabs of one of the elementary components engage respectively in the pairs of orifices of the other elementary component. The stapling tabs of each of the pairs are then bent over toward one another so as to secure the two elementary components together. The corrugated elementary components are thus secured to one another to form the mesh.

As a preference, said corrugated elementary components extend longitudinally. They each include, for example, several tens of deformations of isosceles trapezoidal shape.

Also, and in a way that is particularly advantageous, said tongues are created in said corrugated elementary components by cutting and bending. They are thus produced in a single operation using a suitable punching/stamping press. It will be seen that the anchoring tabs, just like the anchoring orifices, are produced during this same operation.

Other specifics and advantages of the invention will emerge from reading the description given hereinafter of one particular embodiment of the invention, given by way of nonlimiting indication, with reference to the attached drawings in which.

Figure 1:
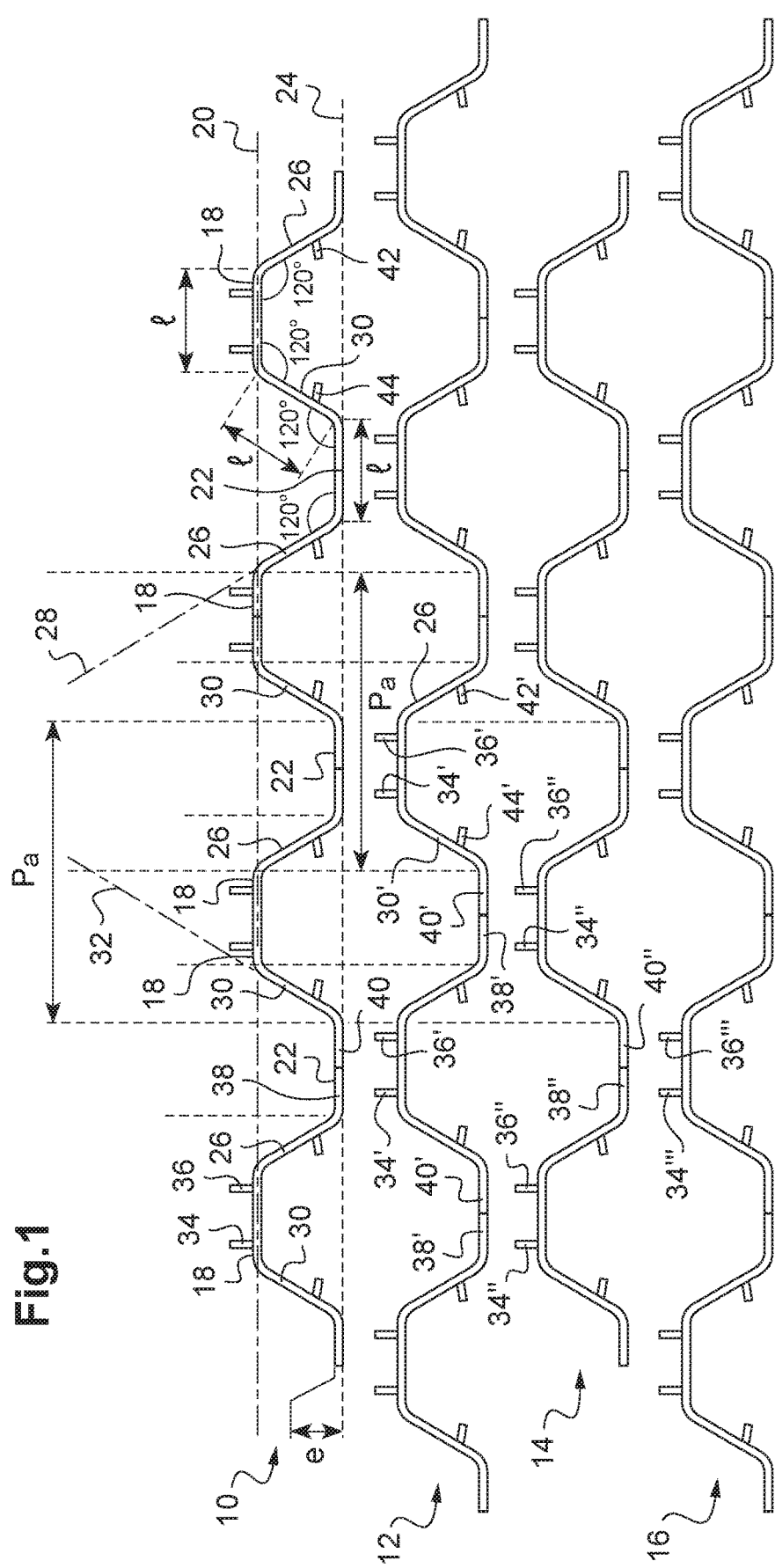
FIG. 1 is a schematic view from above, showing elements making it possible to form a mesh according to the invention.

FIG. 1 illustrates, by way of example, in a view from above resting on a horizontal surface and partially, four identical corrugated elementary components: a first 10, a second 12, a third 14 and a fourth 16. These are juxtaposed facing one another and arranged relative to one another in a particular layout that will be explained later on in the description.

Each of the elementary components 10, 12, 14 and 16 is made from steel strip having a thickness e of 2 mm and a width of 25 mm for example. Strip 19 mm in width may also be used. Alternatively still, strip 38 mm or even 50 mm in width may be used.

The steel strip is then deformed in such a way as to form uniform corrugations of isosceles trapezoidal shape. To do this, the strip is deformed, in this instance in portions of length l measuring 30 mm, twice in the counterclockwise direction through an angle of 120° each, then twice in the opposite direction by the same amount. In that way, there is formed a corrugated elementary component extending in a longitudinal direction and having first parallel portions 18 which are aligned along the one same first straight line 20, opposite second parallel portions 22 aligned along the one same second straight line 24, first inclined portions 26 oriented in the one same first direction 28, and second inclined portions 30 in the one same second direction 32.

In addition to the deformation of the strip itself, which is performed in a suitable punching/stamping press, punching is used at the same time to create, on the one hand, pairs of stapling tabs 34, 36 in the first parallel portions 18 of the deformed strip and corresponding pairs of stapling orifices 38, 40 in the opposite second parallel portions 22 and, on the other hand, pairs of anchoring tongues, a first tongue 42 and a second tongue 44, in the first 26 and second 30 inclined portions extending respectively on each side of the first parallel portions 18.

Thus, the corrugated elementary component 10 has repeating patterns repeating at a pitch Pa and comprising a first parallel portion 18 and a second parallel portion 22 which portions are connected by a first inclined portion 26, and a second inclined portion 30 extending the first parallel portion 18. These four portions of substantially the same length thus constitute a deformation pattern which repeats along the entire length of the corrugated elementary components. They are depicted here only partially because they usually extend longitudinally along lengths that include several tens or hundreds of patterns depending on their use. Thus, in FIG. 1, there are four of them for the sake of explanation and clarity. Once again, this number is usually of the order of several tens or hundreds depending on the area to be covered.

Since the four corrugated elementary components 10, 12, 14, 16 are identical, their alike constituent parts bare identical references suffixed by a single prime (') in the case of the second 12, a double prime (") in the case of the third 14, and a triple prime ('") in the case of the fourth 16.

Figure 2:
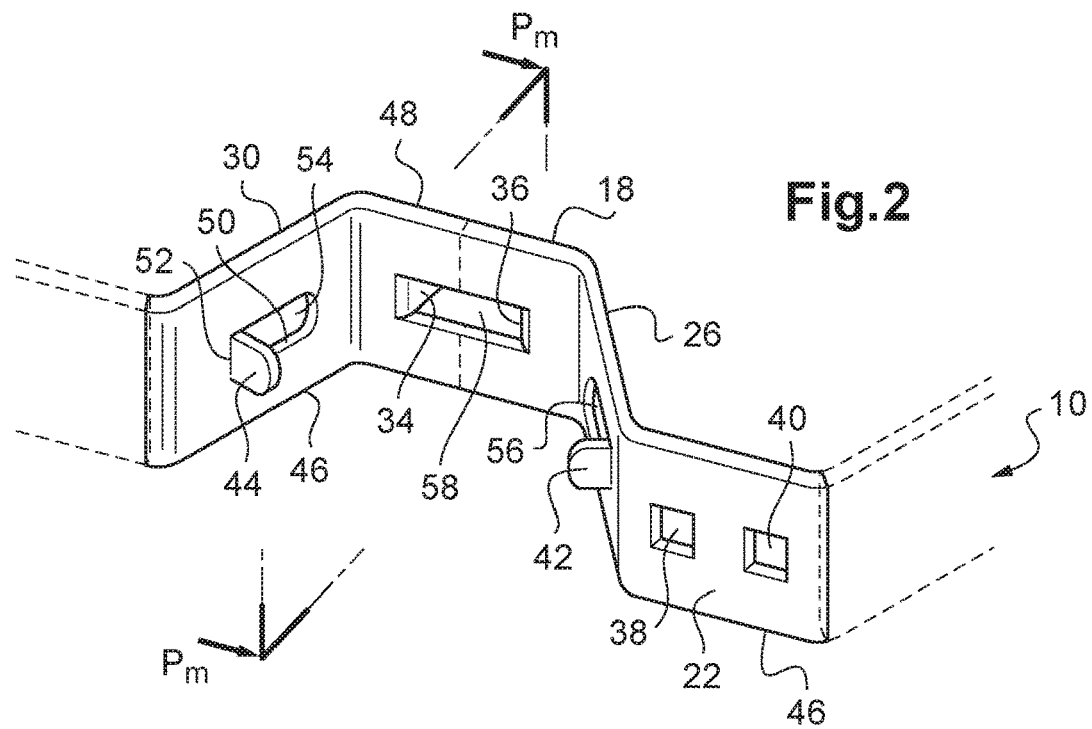
FIG. 2 is a schematic partial perspective view from above of an element illustrated in FIG. 1.

Such a pattern of the corrugated elementary component 10 is described in detail with reference to FIG. 2.

The corrugated elementary component 10 also has 2 opposite edge faces, a contact edge face 46 intended to be pressed against a metal wall as will be explained hereinafter, and an opposite free edge face 48.

Thus, the two anchoring tongues 42, 44 of the pair of anchoring tongues, facing toward one another, can be seen here again. It will be appreciated that the anchoring tongues 42, 44 are cut in the inclined portions 26, 30. Specifically, an oblong cut 50 interrupted at one of its ends 52 is produced during the punching/stamping operation and the second tongue 44 is pushed up and bent around said one of its ends 52 so that it projects from the inclined portion 30. It then reveals a second oblong slot 54.

It may be seen that the second tongue 44 has not only been bent so that it extends out as a projection from the inclined portion 30, but in addition, that it has been cut back and machined at its end so that it exhibits a rounded free end. Hence, the length of the tongue 44 is substantially less than half the length of the oblong slot 54. For example, the second oblong slot 54 has a length of the order of 13 mm, whereas the tongue 44 extends over a length of 6 mm. Also, the oblong slot 54 has for example a width of 8 mm. And it is created for example at a distance of the order of 7 mm away from the contact edge face 46 and substantially parallel thereto.

Furthermore, according to another alternative form of embodiment of the invention, not depicted, the inclined portion is punched in such a way as to create two parallel cuts respectively corresponding to the upper and lower edges of the oblong slot, and one perpendicular central cut connecting the two parallel cuts. One half-tongue is then pushed out on one side of the inclined portion and one half-tongue on the other side. In that way, it is possible to add two additional short tongues per cell and, furthermore, there is no need to cut back the tongues.

Also, it will be noted that, in this example, the second tongue 44 is substantially inclined with respect to the second inclined portion 30 of the corrugated elementary component 10 and that it extends out as a projection therefrom in a direction perpendicular to the second inclined portion 30 over a distance in the region of 5 mm. As a result, the second tongue 44 extends as a projection from the second inclined portion 30 over a length equal to ⅙ of the length of the inclined portion 30.

In a manner that is symmetric with the second inclined portion 30 about a midplane Pm that sections the first parallel portion 18 at right angles into two equal parts, the first inclined portion 26 has a first oblong slot 56 resulting from the freeing of the first tongue 42. The respective dimensions of the first oblong slot 56 and of the first tongue 42 are identical to the second oblong slot 54 and tongue 44.

Furthermore, the first parallel portion 18 of the corrugated elementary component 10 has a longitudinal cavity 58 resulting from the creation of the two stapling tabs 34, 36. The longitudinal cavity 58 is created so that it straddles the midplane Pm, and it extends over a length in the region of ⅔ of the length of the first parallel portion 18. They extend in FIG. 2 parallel to one another, to the rear of the first parallel portion 18. Also, they extend as a projection from the first parallel portion 18 over a length less than ⅓ of the length l of the first parallel portion 18, and substantially in the region of one quarter of this length l.

Furthermore, there are also the stapling orifices 38, 40 of the pair of stapling orifices which are created in the second parallel portion 22. It will be seen that the stapling orifices 38, 40 are spaced apart by a distance equivalent to the distance separating the 2 stapling tabs 34, 36.

Reference will be made again to FIG. 1 in which it may be seen that the second corrugated elementary component 12 extends in a direction parallel to the direction of the first corrugated elementary component 10, the stapling tabs 34', 36' being oriented in the same direction as those of the first, and offset longitudinally by half their pitch Pa/2. Thus, the stapling tabs 34', 36' of the second corrugated elementary component 12 extend respectively facing the stapling orifices 38, 40 of the first corrugated elementary component 10.

As for the third corrugated elementary component 14, this extends in a direction parallel to the direction of the second corrugated elementary component 12, the stapling tabs 34", 36" being oriented in the same direction as those of the second 12, and offset longitudinally by half their pitch Pa/2. The third corrugated elementary component 14 thus extends in the same axial position as the first 10. Thus, the stapling tabs 34", 36" of the third corrugated elementary component 14 extend respectively facing the stapling orifices 38', 40' of the second corrugated elementary component 12.

Regarding the fourth corrugated elementary component 16, this extends in a direction parallel to the direction of the third corrugated elementary component 14, the stapling tabs 34'", 36'" being oriented in the same direction, and offset longitudinally by half their pitch Pa/2. The fourth corrugated elementary component 16 thus extends in the same axial position as the second 12. Thus, the stapling tabs 34'", 36'" of the fourth corrugated elementary component 16 extend respectively facing the stapling orifices 38", 40" of the third corrugated elementary component 14.

In that way, the four corrugated elementary components 10, 12, 14, 16 will be driven respectively against one another in a direction perpendicular to their longitudinal direction so that the stapling tabs 34', 36'; 34", 36"; 34'", 36'" of the second 12, third 14 and fourth 16 corrugated elementary components engage respectively in the stapling orifices 38, 40; 38', 40'; 38", 40" of the first 10, second 12 and third 14 corrugated elementary components.

All the stapling tabs 34', 36'; 34", 36"; 34'", 36'" of the pairs of stapling tabs are then respectively bent over toward one another, so as to secure the four corrugated elementary components 10, 12, 14, 16 to one another.

Figure 3:
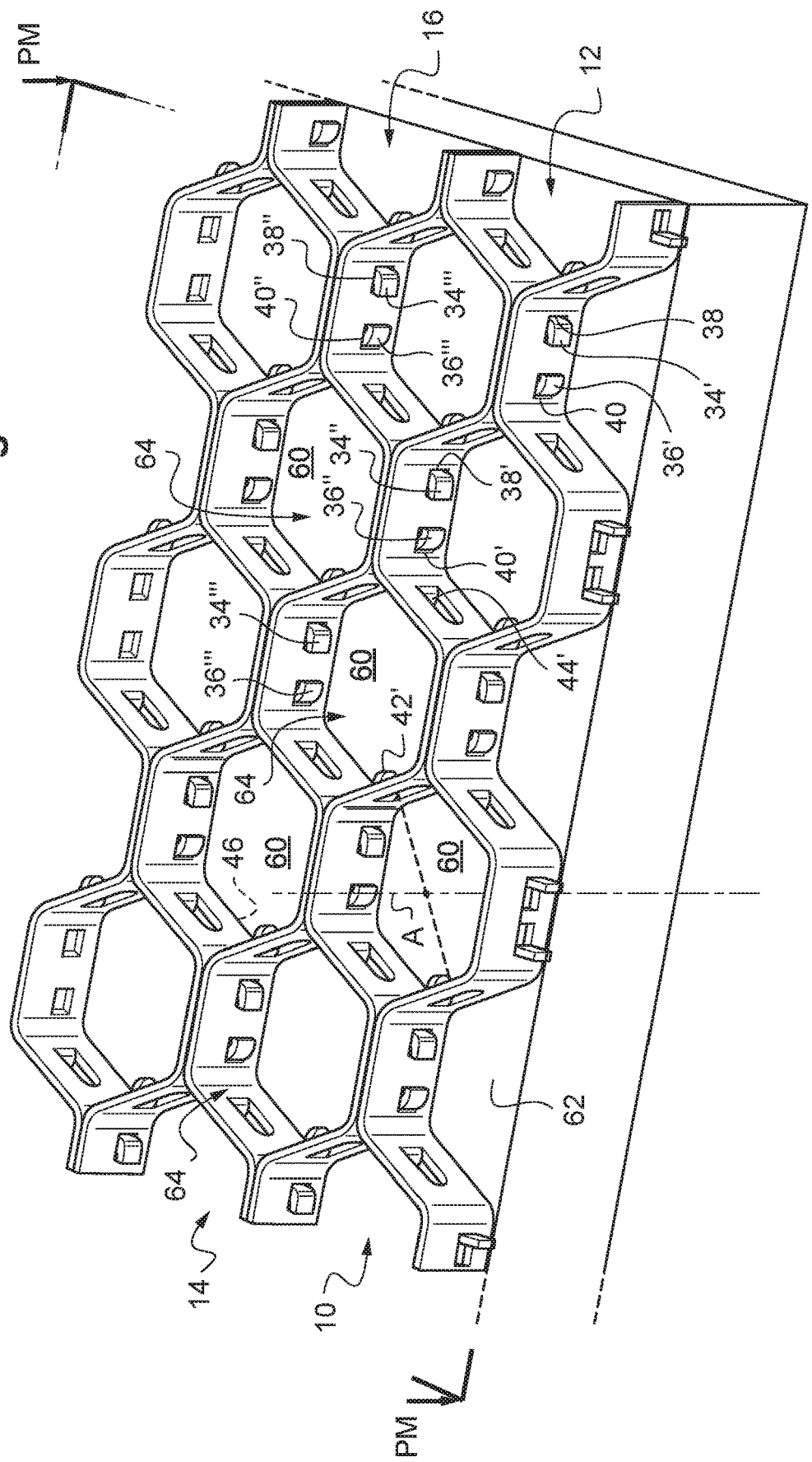
FIG. 3 is a schematic partial perspective view of a mesh according to the invention.

Reference will now be made to FIG. 3 which is a perspective and partial illustration of a mesh thus created and defining a midplane PM.

Here again may be partially seen the first corrugated elementary component 10 connected to the second component 12, itself connected to the third component 14, which is in its turn connected to the fourth component 16.

It is possible to see the stapling tabs 34', 36'; 34", 36"; 34'", 36'" engaged inside the stapling orifices 38, 40; 38', 40'; 38", 40" and respectively in the case of each of the pairs, bent over toward one another.

In that way, the corrugated elementary components 10, 12, 14, 16 define substantially hexagonal closed cylindrical surfaces 60 respectively having a central axis of symmetry A.

According to an alternative form of embodiment of the invention which has not been depicted, the stapling tabs are bent over, not toward one another, but away from one another in order to secure the corrugated elementary components to one another. Also, according to this last alternative form, the second parallel portions may exhibit not two stapling orifices but just one of a greater width.

The mesh illustrated in FIG. 3 rests against a metal wall 62 and each of the closed cylindrical surfaces 60 then defines a cell 64. And extending into each of the cells 64 are two opposing tongues 42, 44 and, to a lesser extent, the bent-over stapling tabs 34', 36'; 34", 36"; 34''', 36'''.

Figure 4:
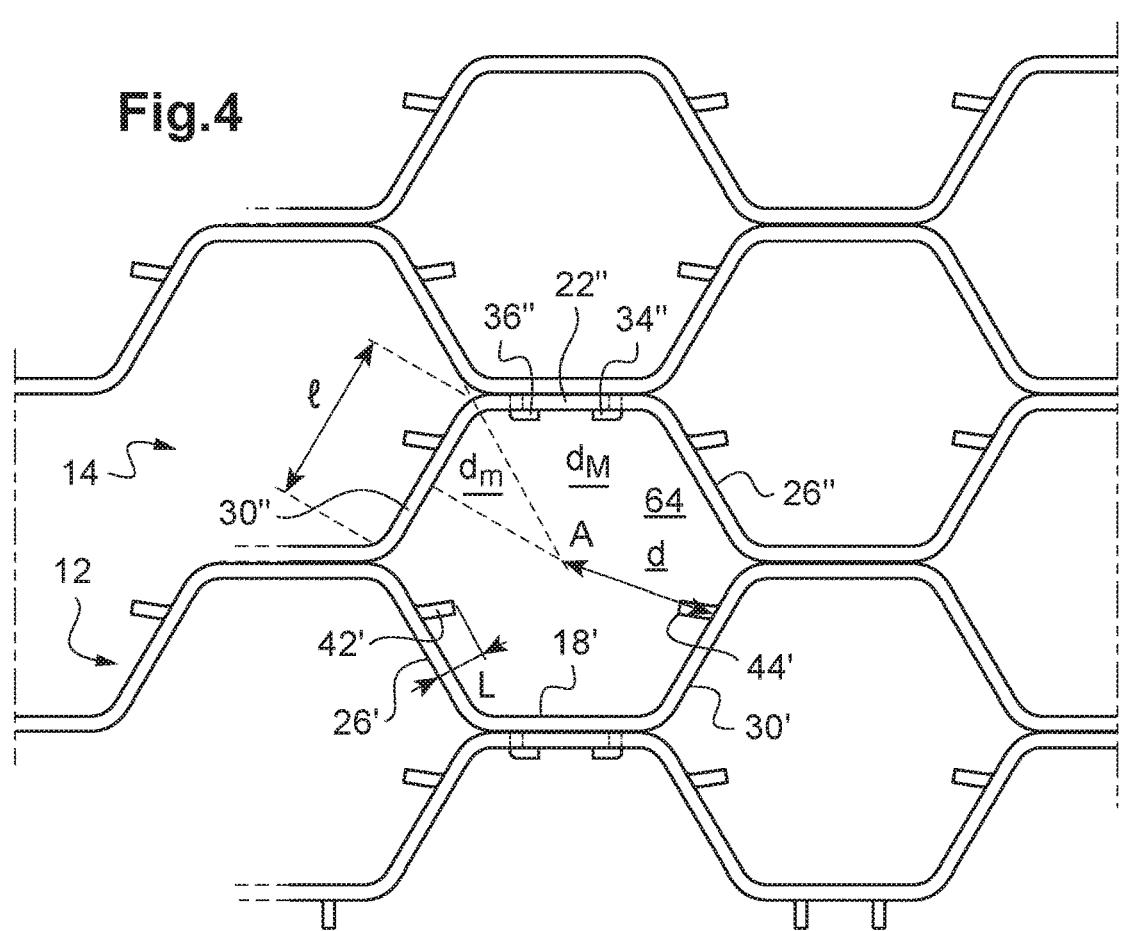
FIG. 4 is a schematic partial view from above and in detail of FIG. 3.

Reference will be made to FIG. 4 which illustrates in detail one cell 64, viewed from above. This figure again shows the two opposing tabs 42', 44' which respectively extend projecting from two inclined portions 26', 30' of the second corrugated elementary component 12.

The closed cylindrical surface formed by the second inclined portion 30', the first parallel portion 18' and the first inclined portion 26' of the second corrugated elementary component 12 on the one hand, and the second inclined portion 30", the second parallel portion 22" and the first inclined portion 26" of the third corrugated elementary component 14 on the other hand, thus define the hexagonal cell 64 with central axis of symmetry A. Thus, the tongues 42', 44' respectively extend as projections from the two inclined portions 26', 30' along a normal to these portions, over a length L less than ⅕ of the distance d that separates the cylindrical surface, at the level of the tongues 42', 44', from the central axis of symmetry A.

It may be observed that the maximum distance dM that separates the cylindrical surface from the central axis of symmetry A is equal, in theory, and without considering the thickness of the corrugated elementary components, to the length l of the portions 30", 22", 26", 30', 18' and 26'; or in other words, to the w length of the sides of the hexagonal cross section of the cylindrical surface. Also, the minimum distance dm, that separates the cylindrical surface from the central axis of symmetry A, namely the normal to the aforementioned portions which meet the central axis of symmetry A, is equal to $\sqrt{3}/2l$.

Therefore, if the length l is equal to 30 mm, and the tongue extends from a part of the cylindrical surface furthest from the central axis of symmetry A, it will extend from the cylindrical surface over a distance of less than 7.5 mm according to the definition of the invention. Under the same conditions, if the tongue extends from a part of the cylindrical surface that is closest to the central axis of symmetry A, it will extend therefrom by a distance of less than 6.5 mm.

It may be seen from FIG. 4 that the center of the cell 64 is relatively accessible. What is more, the bent-over stapling tabs 34", 36" extend into the cell 64 over a distance that is less than that of the tongues 42', 44'. In that way, it contributes to better anchorage of the coating as will be explained hereinafter.

Reference is made once again to FIG. 3 in order to describe the advantages of the invention.

In that way, the mesh thus formed will easily be secured to the metal wall 62 by welding the lower edges of the elementary components 10, 12, 14 and 16 that run along the contact edge face 46 resting against the wall. In order to do this, a molten metal is applied freely, without being hampered by the tongues 42, 44, to the junction between the corrugated elementary components 10, 12, 14, 16, connected to one another, and the metal wall 62. Also, in certain applications, the elementary components are also welded together more easily along their regions of contact on the inside of cylindrical surfaces.

Next, concrete is applied to the cells and forced into them in order to obtain perfect filling. The thickness of concrete can obviously be substantially greater than the height of the cells in order to conceal the free edge face thereof. This additional thickness does not exceed 1 mm. The concrete can then flow under the tongues 42, 44, 42', 44', 42", 44", 42''', 44''' and also into the oblong slots 54, 56 and under the bent-over stapling tabs 34, 36, 34', 36', 34", 36", 34''', 36''' without forming air occlusions.

In that way, when the concrete has hardened, better anchorage of the coating is achieved with low porosity at the mesh.

Also, according to said other alternative form of embodiment of the invention which is not depicted, whereby each of the cells comprises four short tongues, the anchorage of the concrete is also improved.

The invention claimed is:

1. A metal anchoring mesh to be secured to a metal wall of a vessel of a fluid catalytic cracking unit to form cells able to receive an anti-erosion coating protecting the metal wall, the metal anchoring mesh comprising:
a plurality of corrugated elementary components successively joined together to form cylindrical surfaces able respectively to define the cells, the cylindrical surfaces each having a central axis of symmetry A, the corrugated elementary components of the plurality of corrugated elementary components each having projecting tongues, the projecting tongues being able to extend respectively into the cells, wherein the corrugated elementary components have stapling orifices and stapling tabs so that the corrugated elementary components can be successively joined together;
wherein the tongues extend over a length less than one quarter of the distance d extending between the cylindrical surface and the central axis of symmetry A of the cylindrical surface.

2. The metal anchoring mesh of claim 1, wherein the tongues extend over a length less than one fifth of the distance d extending between the cylindrical surface and the central axis of symmetry A of the cylindrical surface.

3. The metal anchoring mesh of claim 1, wherein the corrugated elementary components advantageously have oblong slots extending between two opposite ends, whereas the tongues extend respectively from one of the opposite ends of oblong slot as far as a tongue free end.

4. The metal anchoring mesh of claim 3, wherein the tongues extend over a length shorter than the length of the oblong slots.

5. The metal anchoring mesh of claim 3, wherein the tongue free end is rounded.

6. The metal anchoring mesh of claim 1, wherein the corrugated elementary components have corrugations of isosceles trapezoidal shape.

7. The metal anchoring mesh of claim 6, wherein the corrugations of each of the corrugated elementary components exhibit, in alternation, stapling orifices and stapling tabs.

8. The metal anchoring mesh of claim 1, wherein the corrugated elementary components extend longitudinally.

9. The metal anchoring mesh of claim 1, wherein the tongues are created in the corrugated elementary components by cutting and bending.

* * * * *